US010823239B2

(12) United States Patent
Jung

(10) Patent No.: US 10,823,239 B2
(45) Date of Patent: Nov. 3, 2020

(54) BRAKING APPARATUS

(71) Applicant: HYUNDAI MOBIS CO., LTD., Seoul (KR)

(72) Inventor: Min Kyu Jung, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 42 days.

(21) Appl. No.: 16/174,719

(22) Filed: Oct. 30, 2018

(65) Prior Publication Data

US 2019/0128346 A1 May 2, 2019

(30) Foreign Application Priority Data

Oct. 31, 2017 (KR) .................. 10-2017-0143830

(51) Int. Cl.
| | |
|---|---|
| *F16D 51/30* | (2006.01) |
| *F16D 51/24* | (2006.01) |
| *F16D 51/00* | (2006.01) |
| *F16D 125/06* | (2012.01) |
| *F16D 125/08* | (2012.01) |

(52) U.S. Cl.
CPC ............ *F16D 51/30* (2013.01); *F16D 51/24* (2013.01); *F16D 2051/003* (2013.01); *F16D 2051/005* (2013.01); *F16D 2125/06* (2013.01); *F16D 2125/08* (2013.01)

(58) Field of Classification Search
CPC .... F16D 51/30; F16D 51/24; F16D 2051/005; F16D 2051/003; F16D 2125/08; F16D 2125/06; F16D 55/22655; F16D 55/2265; F16D 55/227; F16D 55/225; F16D 55/226; F16D 65/005; F16D 65/0973; F16D 65/0093; F16D 65/0025; F16D 65/183; F16D 65/0068; F16D 65/0081; F16D 65/14
USPC ........ 188/325, 72.1, 72.4, 71.9, 72.3, 79.54, 188/152, 331, 334
See application file for complete search history.

(56) References Cited

U.S. PATENT DOCUMENTS

| | | | | |
|---|---|---|---|---|
| 3,490,343 | A * | 1/1970 | Afanador | F16D 65/84 92/168 |
| 3,522,865 | A * | 8/1970 | Meier | F16D 55/227 188/72.4 |
| 3,540,554 | A * | 11/1970 | Burnett | F16D 65/22 188/79.62 |
| 4,469,337 | A * | 9/1984 | Yokoi | F16D 55/22655 188/73.31 |
| 4,537,289 | A * | 8/1985 | VonGrunberg | F16D 65/0979 188/264 G |
| 4,678,064 | A * | 7/1987 | Adachi | F16D 55/22655 188/73.45 |

(Continued)

FOREIGN PATENT DOCUMENTS

KR 10-1120977 B1 2/2012

*Primary Examiner* — Robert A. Siconolfi
*Assistant Examiner* — San M Aung
(74) *Attorney, Agent, or Firm* — Knobbe Martens Olson & Bear LLP

(57) ABSTRACT

A braking apparatus may include: a torque plate unit; a piston unit coupled to a shoe liner and configured to be movable inside the torque plate unit; and a dust boot including a boot body enclosing the piston unit and installed between the torque plate unit and the piston unit, and a shape retainer having an annular shape and inserted into one end of the boot body.

5 Claims, 8 Drawing Sheets

(56) References Cited

U.S. PATENT DOCUMENTS

| | | | | |
|---|---|---|---|---|
| 2004/0226783 A1* | 11/2004 | Hall | ........................ | F16D 65/14 |
| | | | | 188/72.4 |
| 2004/0245054 A1* | 12/2004 | Takahashi | ............... | F16D 65/18 |
| | | | | 188/72.1 |
| 2011/0278110 A1* | 11/2011 | Yoko | ................... | F16D 65/0006 |
| | | | | 188/73.37 |
| 2014/0110906 A1* | 4/2014 | Champion | ............ | F16D 65/005 |
| | | | | 277/634 |

* cited by examiner

BRAKING APPARATUS

CROSS-REFERENCES TO RELATED APPLICATIONS

The present application claims priority to Korean application number 10-2017-0143830, filed on Oct. 31, 2017, which is incorporated by reference in its entirety.

BACKGROUND OF THE INVENTION

The present invention relates to a braking apparatus, and more particularly, to a braking apparatus having improved watertightness performance.

In general, a drum brake for a vehicle has a cylindrical shape, and includes a pair of shoe liners which are installed on a back plate configured to rotate along with a wheel and are disposed facing each other, and a drive unit configured to receive driving force and operate the pair of shoe liners such that space between the shoe liners expands in a radial direction.

The drive unit includes pistons coupled to the respective shoe liners. As the pistons move, the distance between the shoe liners increases to perform a braking operation. After the braking operation has been completed, the distance between the shoe liners is reduced so that the shoe liners return to their original positions.

A conventional dust boot encloses outer surfaces of each piston and a housing and functions to prevent foreign material from being drawn into the housing. However, it has been insufficient to secure satisfactory stiffness of the dust boot made of rubber.

Furthermore, there is a problem in that, if the dust boot is damaged, foreign material such as water may enter space formed between the piston and the housing.

The related art of the present invention was introduced in Korean Patent Registration Publication No. 10-1120977 (registered on Feb. 21, 2012, entitled "Electromechanically actuating parking brake").

SUMMARY OF THE INVENTION

Embodiments of the present invention are directed to a braking apparatus in which a shape retainer is inserted into a dust boot so that the dust boot can be compressed and tightly assembled between a torque plate unit and a piston unit, thus enhancing the watertightness performance of the braking apparatus.

In one embodiment, a braking apparatus may include: a torque plate unit; a piston unit coupled to a shoe liner and configured to be movable inside the torque plate unit; and a dust boot comprising: a boot body enclosing the piston unit and installed between the torque plate unit and the piston unit; and a shape retainer having an annular shape and inserted into one end of the boot body. A hook part may be formed on the one end of the boot body into which the shape retainer is inserted, the hook part protruding toward the piston unit so that the hook part is hooked around a stop protrusion protruding outward from the piston unit.

The hook part may extend along an inner circumferential surface of the boot body such that the hook part comes into contact along an outer circumferential surface of the piston unit.

A slip prevention part may be formed protruding from the boot body toward the torque plate unit along an outer circumferential surface of the one end of the boot body in which the shape retainer is installed.

The slip prevention part may comprise a plurality of slip prevention parts disposed on the outer circumferential surface of the boot body at positions spaced apart from each other.

A pressurizing protrusion may be formed on the boot body, the pressurizing protrusion protruding from an inner edge of the boot body in a direction away from the shoe liner, and pressurizing the piston unit.

The shape retainer may be made of steel.

The piston unit may include: a piston head coupled to the shoe liner; a piston body configured to reciprocate inside the torque plate unit; and a connector disposed between the piston head and the piston body and configured to couple the piston head with the piston body.

An outer diameter of one surface of the connector that is coupled with the piston head may be less than an outer diameter of the piston head. An outer diameter of another surface of the connector that is coupled with the piston body may be less than an outer diameter of the piston body.

The hook part may come into surface contact with an outer circumferential surface of the piston unit between the piston unit and the shape retainer, and when the piston unit reciprocates in a left-right direction, the hook part may remain in surface contact with the piston unit.

DESCRIPTION OF SPECIFIC EMBODIMENTS

Hereinafter, an embodiment of a braking apparatus in accordance with the present invention will be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
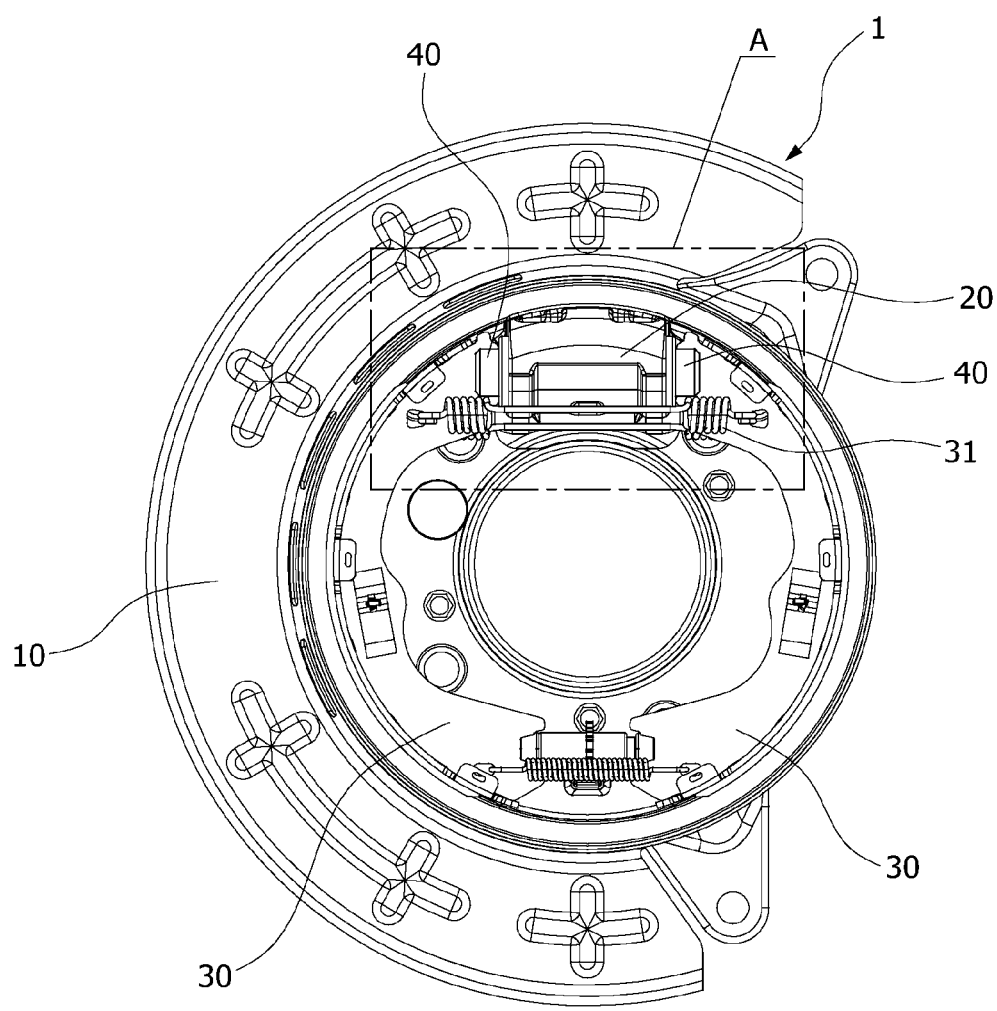
FIG. 1 is a front diagram illustrating a braking apparatus in accordance with an embodiment of the present invention.
Figure 2:
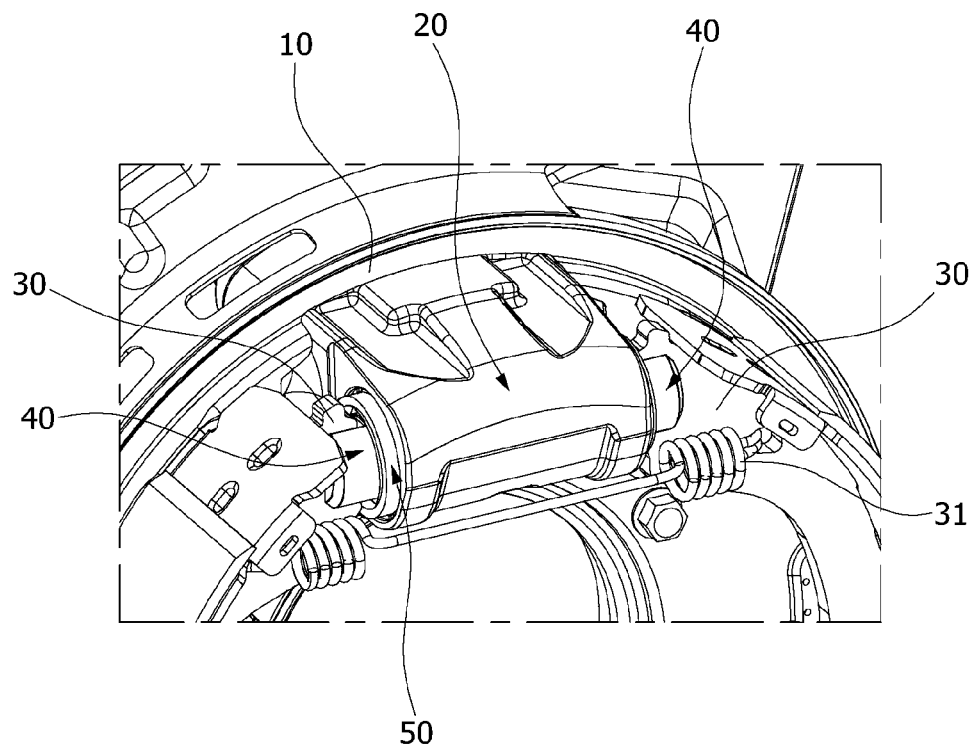
FIG. 2 is an enlarged diagram of portion A of FIG. 1.
Figure 3:
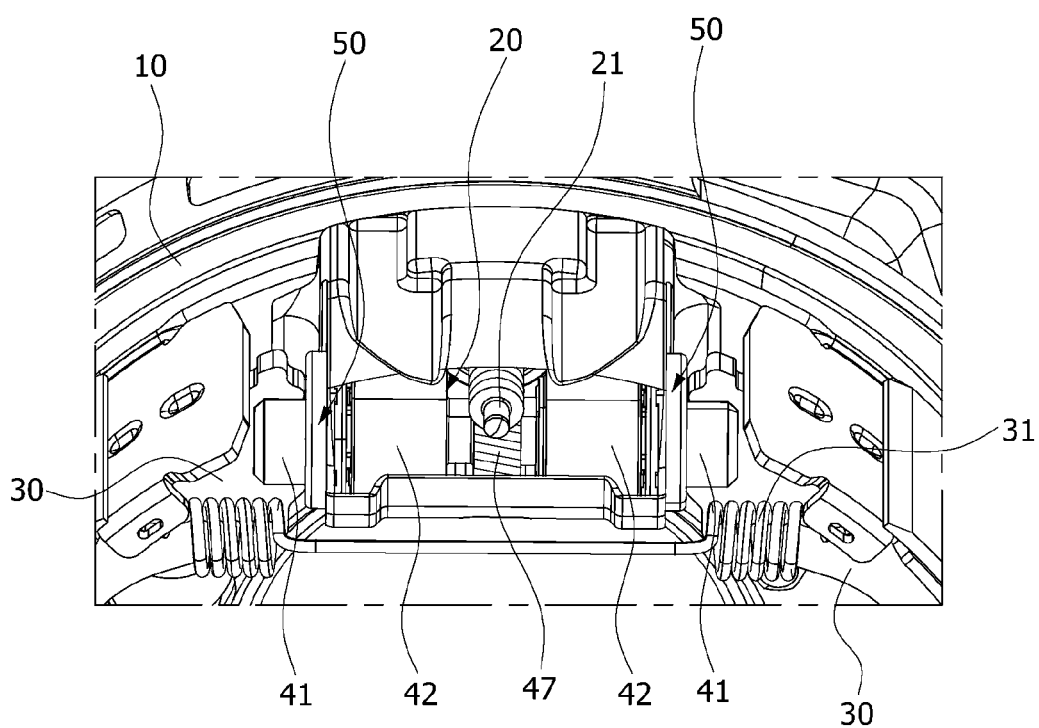
FIG. 3 is a sectional perspective diagram illustrating the braking apparatus in accordance with the embodiment of the present invention.
Figure 4:
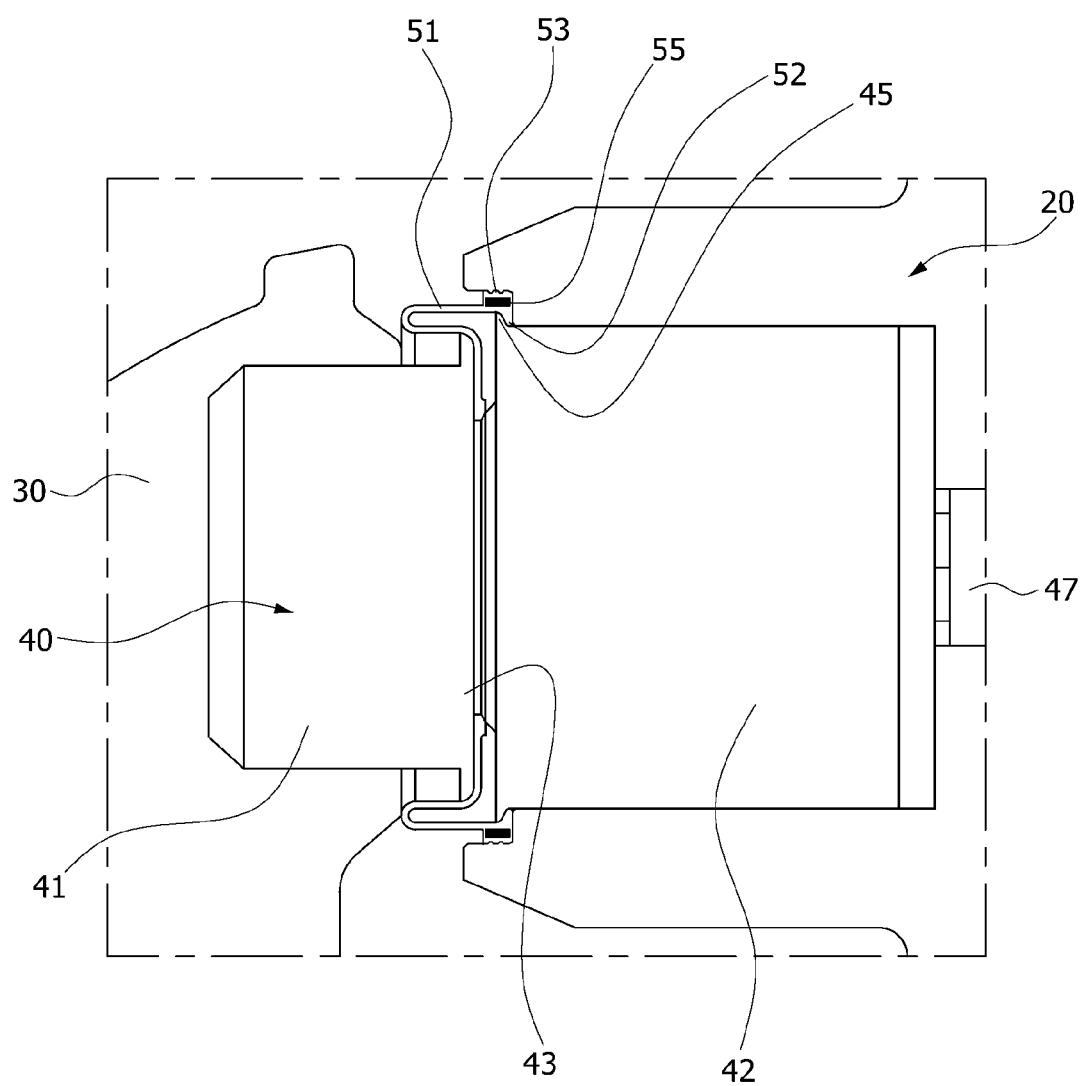
FIG. 4 is a sectional diagram illustrating the braking apparatus in accordance with the embodiment of the present invention.
Figure 5:
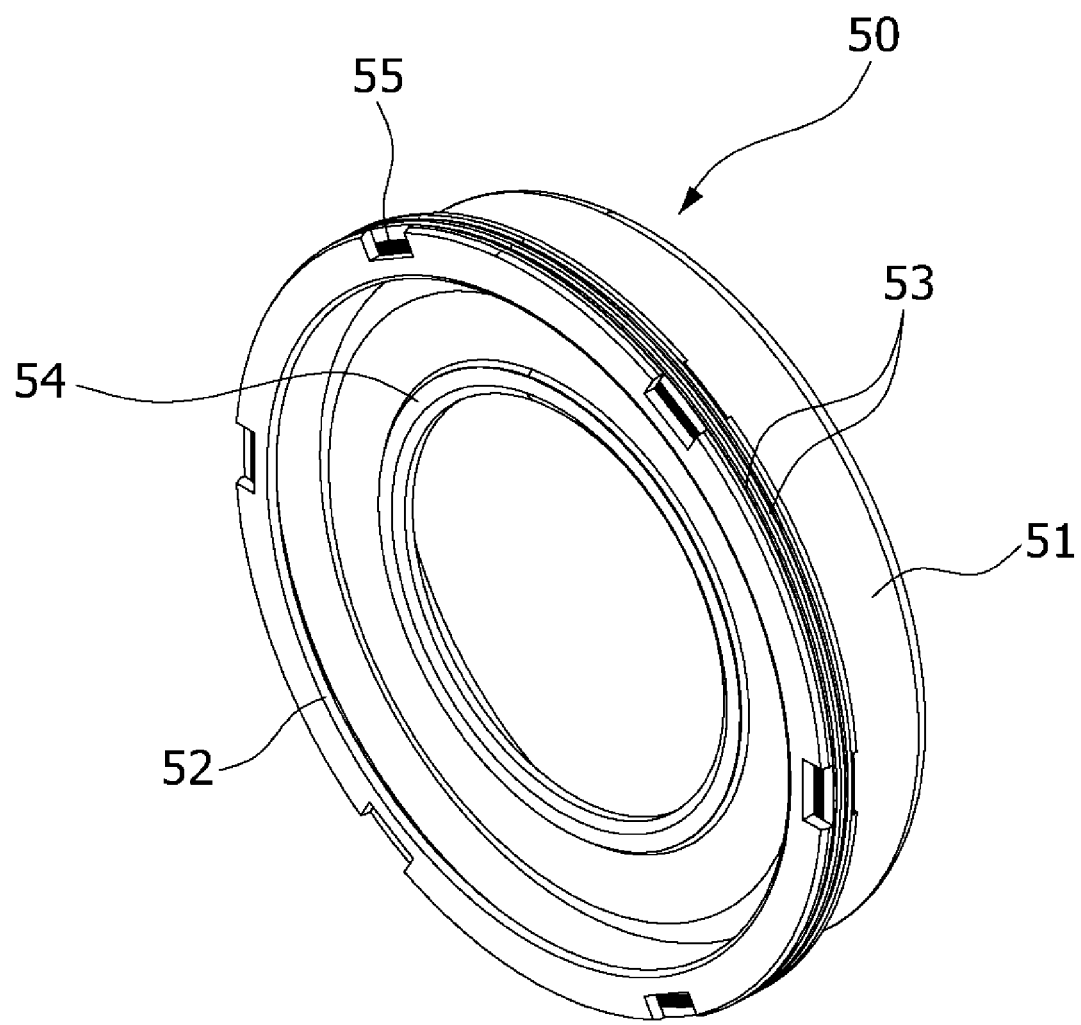
FIG. 5 is a perspective diagram illustrating a dust boot in accordance with the embodiment of the present invention.
Figure 6:
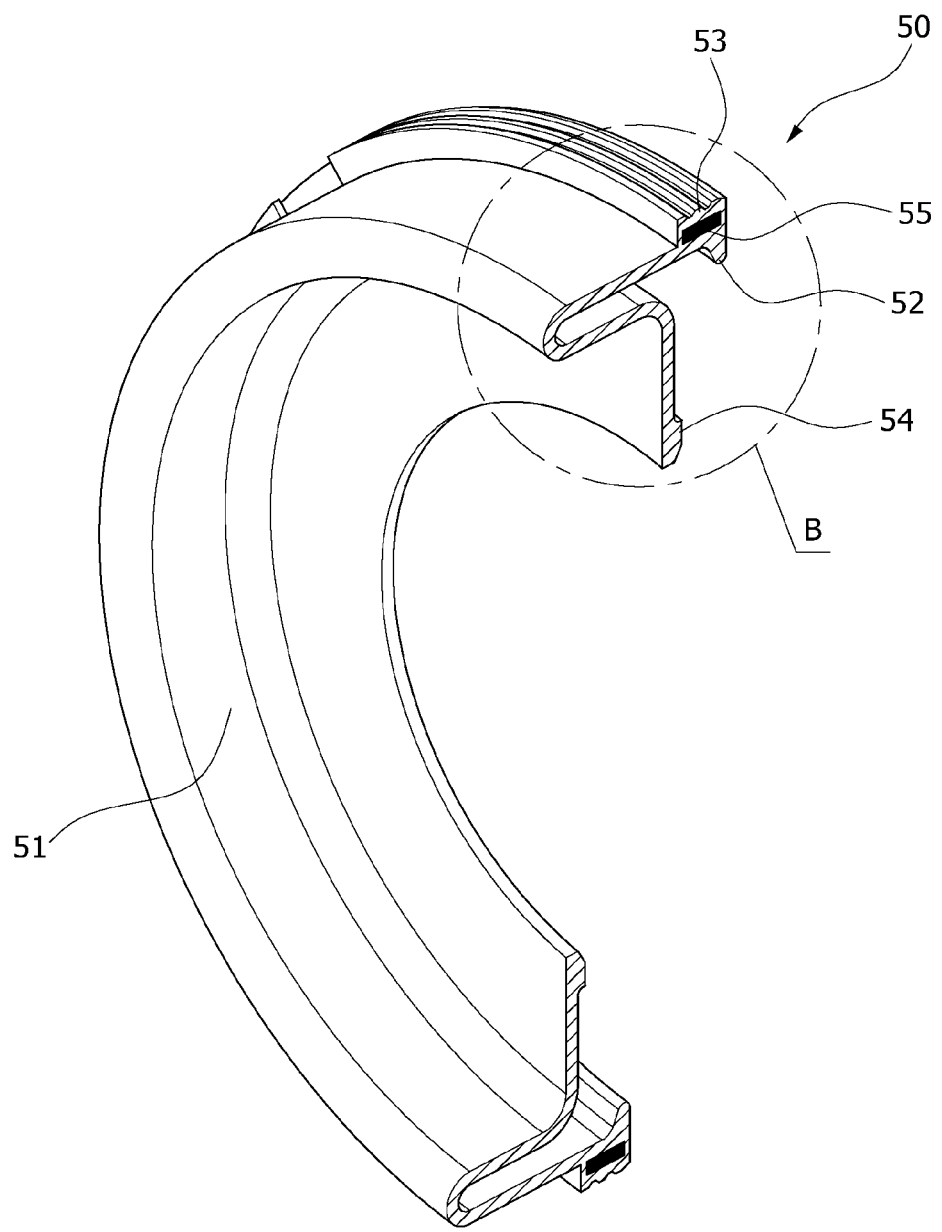
FIG. 6 is a sectional diagram illustrating the dust boot in accordance with the embodiment of the present invention.
Figure 7:
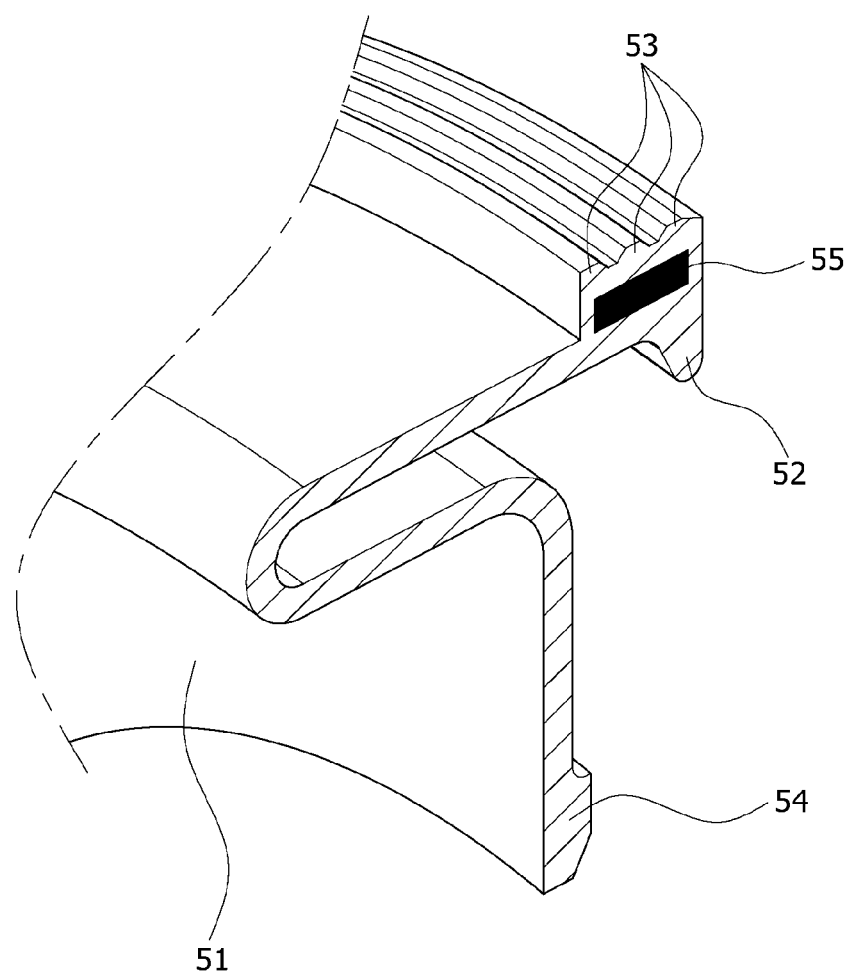
FIG. 7 is an enlarged sectional diagram of portion B of FIG. 6.
Figure 8:
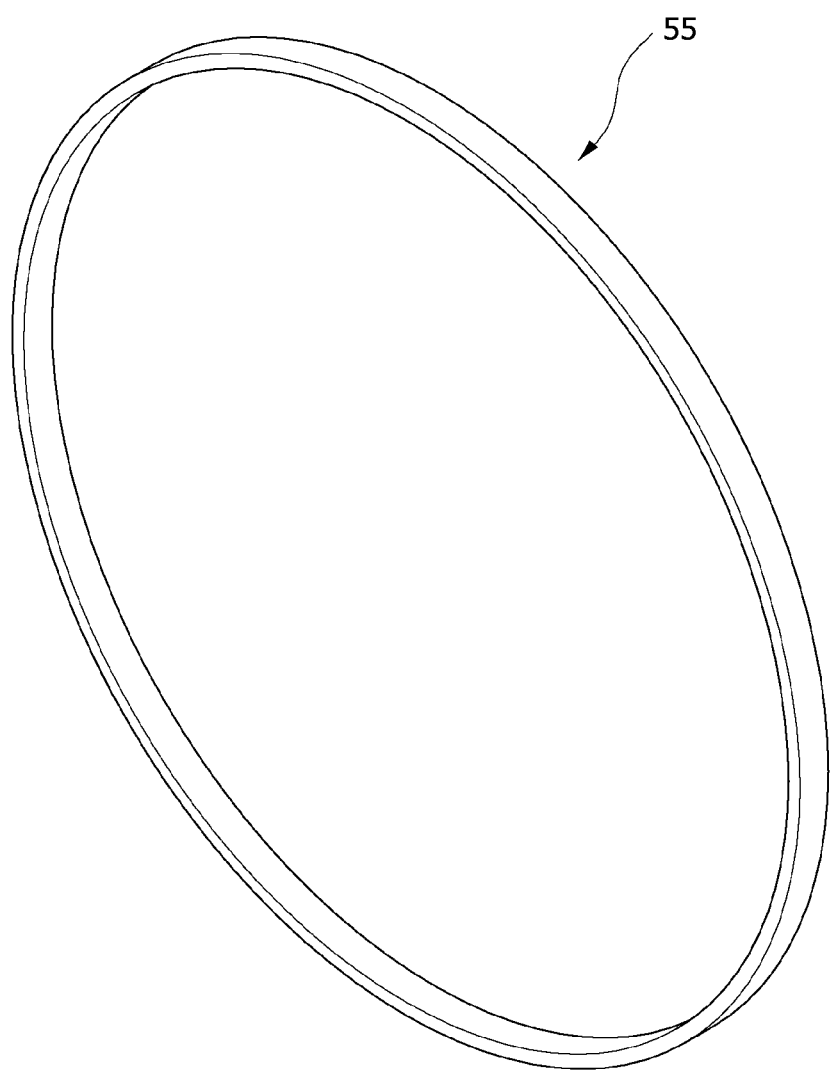
FIG. 8 is a perspective diagram illustrating a shape retainer in accordance with the embodiment of the present invention.

FIG. 1 is a front view illustrating a braking apparatus in accordance with an embodiment of the present invention. FIG. 2 is an enlarged view of portion A of FIG. 1. FIG. 3 is a sectional perspective view illustrating the braking apparatus in accordance with the embodiment of the present invention. FIG. 4 is a sectional view illustrating the braking apparatus in accordance with the embodiment of the present invention. FIG. 5 is a perspective diagram illustrating a dust boot in accordance with the embodiment of the present invention. FIG. 6 is a sectional diagram illustrating the dust boot in accordance with the embodiment of the present invention. FIG. 7 is an enlarged sectional diagram of portion B of FIG. 6. FIG. 8 is a perspective diagram illustrating a shape retainer in accordance with the embodiment of the present invention.

Referring to FIGS. 1 to 8, the braking apparatus 1 in accordance with the embodiment of the present invention may include a torque plate unit 20, a piston unit 40, and a dust boot 50.

Referring to FIGS. 1 to 3, the torque plate unit 20 in accordance with the embodiment of the present invention may be coupled to a back plate 10, and include therein a power source such as a drive motor. The torque plate unit 20 may transmit driving force to the piston unit 40 to move the piston unit 40 in a left-right direction (based on FIG. 1).

The torque plate unit 20 in accordance with the embodiment of the present invention may transmit rotating force of a power transmission gear unit 21 to the piston unit 40 and convert the rotational motion into linear motion with respect to a left-right direction (based on FIG. 4) of the piston unit 40, but the present invention is not limited thereto. In other words, various modifications are possible; for example, the power source may be directly coupled to the piston unit 40 to move the piston unit 40 in the left-right direction (based on FIG. 4).

The torque plate unit 20 may be installed outside the piston unit 40. The piston unit 40 may reciprocate inside the torque plate unit 20.

Referring to FIGS. 1 to 3, a plurality of shoe liners 30 are coupled to each other by a return spring 31. The return spring 31 is formed of elastic material so that the length thereof extends when the shoe liners 30 expand in a left-right direction, and reduces when the shoe liners 30 contract in the left-right direction.

Referring to FIG. 4, the piston unit 40 in accordance with the embodiment of the present invention is coupled to each shoe liner 30 and is configured to be movable inside the torque plate unit 20.

In the present embodiment, a plurality of piston units 40 are provided on opposite sides based on a medial portion of the torque plate unit 20 such that the piston units 40 face each other. The plurality of shoe liners 30 are coupled to the respective piston units 40 so that, when the piston units 40 reciprocate using driving force transmitted from the torque plate unit 20, the plurality of shoe liners 30 move along with the respective piston units 40.

Referring to FIG. 4, each piston unit 40 in accordance with the embodiment of the present invention may include a piston head 41, a piston body 42, and a connector 43.

The piston head 41 in accordance with the embodiment of the present invention is coupled to the corresponding shoe liner 30. The piston body 42 may reciprocate inside the torque plate unit 20. The connector 43 is disposed between the piston head 41 and the piston body 42, and connects the piston head 41 with the piston body 42.

The piston head 41, the piston body 42, and the connector 43 are integrated with each other. In the embodiment of the present invention, an outer diameter of a surface of the connector 43 that is coupled with the piston head 41 is less than an outer diameter of the piston head 41. An outer diameter of another surface of the connector 43 that is coupled with the piston body 42 is less than an outer diameter or the piston body 42.

Thereby, an inner edge of a boot body 51, which will be described later herein, is brought into contact with the connector 43, and disposed between the piston head 41 and the piston body 42, thus preventing water, foreign material, or the like from being drawn into the torque plate unit 20.

Referring to FIGS. 1, and 3 to 7, the dust boot 50 in accordance with the embodiment of the present invention is installed between the torque plate unit 20 and the piston unit 40 and functions to prevent foreign material such as water from being drawn into the torque plate unit 20. The dust boot 50 may include the boot body 51, and a shape retainer 55.

Referring to FIGS. 4 to 7, the boot body 51 encloses the piston unit 40 and is installed between the torque plate unit 20 and the piston unit 40 to prevent foreign material such as water from being drawn into the torque plate unit 20.

The boot body 51 in accordance with the embodiment of the present invention may be formed of rubber. Thereby, when the piston unit 40 reciprocates in the torque plate unit 20 in the left-right direction (based on FIG. 4), the boot body 51 may elastically change in shape. The boot body 51 may be compressed and tightly assembled between the piston unit 40 and the torque plate unit 20, thus reliably preventing foreign material from being drawn into the torque plate unit 20.

Referring to FIGS. 4 to 7, in the embodiment of the present invention, a hook part 52 is formed protruding from the boot body 51 toward the piston unit 40 so that the hook part 52 is hooked around a stop protrusion 45 protruding outward from the piston unit 40.

Thanks to the hook part 52, even if clamping force with which the boot body 51 clamps the piston unit 40 is reduced or the piston unit 40 is damaged, one end of the boot body 51 can be hooked around and brought into close contact with the stop protrusion 45 of the piston unit 40, thus preventing foreign material from being drawn into the torque plate unit 20.

The hook part 52 may be formed on the one end of the boot body 51 into which the shape retainer 55 is inserted, and may protrude between the piston unit 40 and the shape retainer 55 toward the piston unit 40 (refer to FIG. 4).

The hook part 52 comes into surface contact with an outer circumferential surface of the piston unit 40 between the piston unit 40 and the shape retainer 55. Furthermore, even when the piston unit 40 reciprocates in the left-right direction (based on FIG. 4), the hook part 52 remains in surface contact with the piston unit 40, thereby reliably preventing foreign material such as water from being drawn into the torque plate unit 20.

Referring to FIGS. 5 to 7, the hook part 52 in accordance with the embodiment of the present invention extends along an inner circumferential surface of the boot body 51 such that the hook part 52 comes into contact along the outer circumferential surface of the piston unit 40. In this way, the hook part 52 comes into contact with the entire section of the outer circumferential surface of the piston unit 40 and thus reliably prevents foreign material from being drawn into the torque plate unit 20.

Referring to FIG. 4, the hook part 52 in accordance with the embodiment of the present invention comes into contact with the piston unit 40, in detail, the stop protrusion 45 protruding outward from the left end (based on FIG. 4) of the piston body 42. The stop protrusion 45 primarily blocks foreign material such as water from entering the torque plate unit 20, and the hook part 52 secondarily blocks the foreign material from entering the torque plate unit 20.

Referring to FIGS. 4 to 7, a slip prevention part 53 in accordance with the embodiment of the present invention may be provided along the outer circumferential surface of the one end of the boot body 51 in which the shape retainer 55 is installed, and may protrude toward the torque plate unit 20.

In detail, referring to FIG. 4, the slip prevention part 53 is formed on the outer circumferential surface of the boot body 51 that is disposed over the shape retainer 55, and protrudes toward the torque plate unit 20 (upward based on FIG. 4).

Thereby, when the piston unit 40 reciprocates inside the torque plate unit 20 in the left-right direction, the slip prevention part 53 remains in contact with the torque plate unit 20, thus preventing foreign material from being drawn into the torque plate unit 20.

In the embodiment of the present invention, a plurality of slip prevention parts 53 are provided on the outer circumferential surface of the boot body 51 and disposed at positions spaced apart from each other. Thereby, a path along which foreign material may be drawn into the torque plate unit 20 may be blocked, and the dust boot 50 may be compressed and tightly assembled between the torque plate unit 20 and the piston unit 40.

Referring to FIGS. 4 to 7, in the embodiment of the present invention, a pressurizing protrusion 54 protrudes from the inner edge of the boot body 51 in a direction (in a right direction based on FIG. 4) away from the shoe liner 30.

The pressurizing protrusion 54 is formed of rubber. When the piston unit 40 reciprocates in the torque plate unit 20, the pressurizing protrusion 54 comes into close contact with the piston unit 40, in detail, a left surface (based on FIG. 4) of the piston body 42.

Referring to FIGS. 4 to 7, the inner edge of the boot body 51 on which the pressurizing protrusion 54 is provided may be disposed between the piston head 41 and the piston body 42 and brought into contact with the connector 43.

Since the pressurizing protrusion 54 comes into contact with the connector 43 and makes contact with and pressurizes the piston body 42, it provides an effect of blocking foreign material from being drawn into the torque plate unit 20 from the piston head 41 via the piston body 42.

Referring to FIGS. 1 to 8, the shape retainer 55 in accordance with the embodiment of the present invention is inserted into the one end of the boot body 51, and has an annular shape.

The shape retainer 55 is disposed outside the piston unit 40 and inserted into the boot body 51 made of rubber so as to retain the shape of the boot body 51. The boot body 51 is compressed and tightly assembled between the torque plate unit 20 and the piston unit 40, thus preventing foreign material such as water from being drawn into the torque plate unit 20.

Referring to FIGS. 4 to 8, the shape retainer 55 in accordance with the embodiment of the present invention is made of steel, but it is not limited thereto. The shape retainer 55 may be modified in various ways; for example, it may be made of various metals such that the stiffness thereof is maintained, and it is prevented from being deformed.

Referring to FIGS. 4 to 8, the shape retainer 55 in accordance with the embodiment of the present invention has an annular shape and defines a through hole therein to allow the piston unit 40 to pass through the shape retainer 55.

The shape retainer 55 is inserted into the boot body 51 to retain the shape of the boot body 51, thus having effects of securing the stiffness of the dust boot 50 and maintaining the pressurizing force.

In addition, the shape retainer 55 is inserted into the dust boot 50 and pressurizes the hook part 52 disposed between the shape retainer 55 and the piston unit 40 so that the hook part 52 can come into close contact with the outer circumferential surface of the piston unit 40, thus having an effect of preventing foreign material such as water from being drawn into the torque plate unit 20.

Hereinafter, the operating principle and the effect of the braking apparatus 1 in accordance with the embodiment of the present invention will be described.

An actuator is mounted in a duo servo type parking brake, i.e., a drum in hat (DIH) parking brake. The distance between the shoe liners 30 is expanded or contracted by reciprocating the piston unit 40 using the actuator. In this way, an braking operation is performed.

Referring to FIGS. 1 to 3, the torque plate unit 20 is coupled to the back plate 10, and the actuator is installed in the torque plate unit 20. The actuator drives a motor and rotates the power transmission gear unit 21 to transmit driving force to the piston unit 40.

In the present embodiment, a plurality of piston units 40 are provided in the torque plate unit 20 and disposed facing each other. The rotating force of the power transmission gear unit 21 in the torque plate unit 20 is transmitted to a drive gear 47 for the piston units 40

The drive gear 47 of the piston unit 40 disposed at a left side (based on FIG. 3) of the plurality of piston units 40 receives the rotating force. The piston units 40 reciprocate in the left-right direction (based on FIG. 3) by interaction between the drive gear 47 and a nut member which is coupled to the drive gear 47 and installed on the piston unit 40 disposed at a right side (based on FIG. 3).

When the piston units 40 reciprocate, the plurality of shoe liners 30 coupled to the respective piston units 40 expand or contract so that the distance between the shoe liners 30 is increased or reduced.

The shoe liners 30 are coupled by the return spring 31. The she liners 30 may return to original positions by the return spring 31 made of elastic material.

Referring to FIGS. 1 to 4, the dust boot 50 in accordance with the embodiment of the present invention is disposed between the torque plate unit 20 and each piston unit 40 so that foreign material such as water may be prevented from being drawn into the torque plate unit 20.

The dust boot 50 includes the boot body 51 and the shape retainer 55. Since the shape retainer 55 is installed in the boot body 51, the shape of the dust boot 50 may be retained, and the dust boot 50 may be compressed and tightly assembled between the torque plate unit 20 and the piston unit 40, thus preventing foreign material from being drawn into the torque plate unit 20.

The hook part 52 protrudes toward the piston unit 40 from the one end of the boot body 51 into which the shape retaining unit 55 is inserted. Thereby, the dust boot 50 may be compressed and tightly assembled between the shape retainer 55 and the torque plate unit 20 while the hook part 52 comes into contact with the piston unit 40. Consequently, foreign material may be reliably prevented from being drawn into the torque plate unit 20.

The hook part 52 extends along the inner circumferential surface of the boot body 51 and comes into contact with the entire section of the outer circumferential surface of the piston unit 40 so that foreign material may be fundamentally prevented from being drawn into the torque plate unit 20.

Referring to FIGS. 4 to 7, thanks to the slip prevention parts 53 in the embodiment of the present invention, the dust boot 50 may be prevented from being removed from the correct position when the piston unit 40 reciprocates in the torque plate unit 20 in the left-right direction (based on FIG. 4).

In addition, the slip prevention units 53 come into close contact with the torque plate unit 20, thus having an effect of blocking foreign material from entering the torque plate unit 20.

In the present embodiment, the plurality of slip prevention parts 53 are provided on the outer circumferential surface of the boot body 51 and disposed at position spaced apart from each other. Hence, compared to a structure having a single slip prevention part, friction between the dust boot 50 and the torque plate unit 20 is increased, and the dust boot 50 may be more reliably prevented from being removed from the correct position, whereby the watertightness performance of the braking apparatus may be enhanced.

Referring to FIGS. 4 to 7, due to the pressurizing protrusion 54 protruding from the inner edge of the boot body 51 in the direction away from the shoe liner 30, foreign material may be prevented from drawn from the outside of the torque plate unit 20 toward the piston unit 40.

Referring to FIGS. 4 to 8, since the shape retainer 55 in accordance with the embodiment of the present invention is made of steel, the stiffness of the dust boot 50 may be secured, and the boot boy 51 may be fixed in position between the torque plate unit 20 and the piston unit 40.

Furthermore, since the shape retainer 55 is made of steel, the shape retainer 55 pressurizes, between the shape retainer 55 and the torque plate unit 20 and between the shape retainer 55 and the piston 40, the boot body 51 made of rubber toward the torque plate unit 20 and the piston unit 40, respectively. Thereby, the tightness of the dust boot 50 may be enhanced.

Since the tightness of the dust boot 50 is enhanced, the dust boot 50 may be prevented from being removed out of the torque plate unit 20, and foreign material may be reliably prevented from being drawn into the torque plate unit 20.

As described above, in a braking apparatus in accordance with the present invention, due to a shape retainer, a boot body may be compressed and tightly assembled between a torque plate unit and a piston unit and remains in shape, whereby foreign material may be prevented from being drawn into the torque plate unit.

Furthermore, since the shape retainer is made of steel, the shape of the boot body is retained so that the stiffness of the dust boot may be secured.

In addition, due to a hook part, the dust boot may be tightly assembled with the piston unit, whereby foreign material may be prevented from being drawn into the torque plate unit.

Furthermore, the hook part extends along an inner circumferential surface of the boot body and comes into contact with an entire section of an outer circumferential surface of the piston unit so that foreign material may be fundamentally prevented from being drawn into the torque plate unit.

Furthermore, due to a slip prevention part, when the piston unit reciprocates in the torque plate unit, the dust boot may be prevented from being removed out of the piston unit.

Furthermore, since the slip prevention part comes into close contact with the torque plate unit, foreign material may be prevented from being drawn into the torque plate unit.

In addition, a plurality of slip prevention parts are provided on the outer circumferential surface of the boot body and disposed at position spaced apart from each other. Hence, compared to a structure having a single slip prevention part, friction between the dust boot and the torque plate unit is increased, and the dust boot may be more reliably prevented from being removed from the correct position, whereby the watertightness performance of the braking apparatus may be enhanced.

Furthermore, due to a pressurizing protrusion, foreign material may be prevented from being drawn into the piston unit from the outside of the torque plate unit.

Although the preferred embodiment of the invention has been disclosed for illustrative purposes, those skilled in the art will appreciate that various modifications, additions and substitutions are possible, without departing from the scope and spirit of the invention as defined in the accompanying claims. Therefore, the spirit and scope of the present invention should be defined by the accompanying claims.

What is claimed is:

1. A braking apparatus comprising:
a torque plate unit configured to generate driving force;
a shoe liner configured to move for performing braking operation;
a piston coupled to the shoe liner and configured to receive the driving force from the torque plate unit and move to push the shoe liner, wherein the piston comprises a piston head, a piston body and a connector interconnecting the piston head and the piston body, wherein the piston head is coupled to the shoe liner such that, when the piston body moves by the driving force, the piston head is configured to push the shoe liner; and
a dust boot coupled to the piston and comprising: a boot body surrounding the piston;
and a shape retainer having an annular shape,
wherein the torque plate unit comprises a recess for receiving the piston and the dust boot, wherein the recess comprises:
a first inner recess wall configured to form a piston receiving recess portion for receiving the piston;
a second inner recess wall configured to form a dust boot receiving recess portion for receiving the dust boot; and
a dust boot seat wall connecting the first inner recess wall and the second inner recess wall for providing a seat for the dust boot,
wherein the boot body comprises an inner circumferential portion interposed between the piston head and the piston body and surrounding the connector,
wherein the boot body comprises an outer circumferential portion received in the dust boot receiving recess portion, wherein the shape retainer is inserted in the outer circumferential portion,
wherein the boot body comprises a hook part formed on an inner surface of the outer circumferential portion and protruding toward piston body,
wherein the piston comprises a stop protrusion protruding outward from the piston body toward the outer circumferential portion of the boot body, wherein the hook part is disposed between the stop protrusion and the dust boot seat wall such that the stop protrusion is configured to stop the hook part.

2. The braking apparatus of claim 1, wherein the hook part extends from the inner surface of the outer circumferential portion of the boot body such that the hook part comes into contact along an outer circumferential surface of the piston.

3. The braking apparatus of claim 1, wherein the boot body comprising a slip prevention part protruding from an outer surface of the outer circumferential portion toward the second inner recess wall of the torque plate unit.

4. The braking apparatus of claim 1, wherein the shape retainer is made of steel.

5. The braking apparatus of claim 1, wherein the hook part is configured to come into surface contact with an outer circumferential surface of the piston body, wherein the hook part is configured to remain in surface contact with the piston body when the piston reciprocates.

\* \* \* \* \*